Oct. 24, 1950    W. B. GREEN    2,527,128
ANCHOR BOLT
Filed Aug. 2, 1947    3 Sheets-Sheet 1

WALTER BRINTON GREEN INVENTOR.

BY
Cassar and Rinse
ATTORNEYS.

Oct. 24, 1950 W. B. GREEN 2,527,128
ANCHOR BOLT
Filed Aug. 2, 1947 3 Sheets-Sheet 2

WALTER. BRINTON. GREEN INVENTOR.

BY
Caesar and Rivise
ATTORNEYS.

Oct. 24, 1950  W. B. GREEN  2,527,128
ANCHOR BOLT
Filed Aug. 2, 1947  3 Sheets-Sheet 3

WALTER BRINTON GREEN  INVENTOR.

BY Caesar and Rivise
ATTORNEYS

Patented Oct. 24, 1950

2,527,128

UNITED STATES PATENT OFFICE 2,527,128

ANCHOR BOLT

Walter Brinton Green, Philadelphia, Pa., assignor to Super-Grip Anchor Bolt Co., Inc., Philadelphia, Pa., a corporation of Pennsylvania Application August 2, 1947, Serial No. 765,716

3 Claims. (Cl. 85—2.4)

This invention relates to anchor bolts and anchor bolt anchors.

Anchor bolts now in use are objectionable because they can be dislodged with comparative ease. As a result they often become loose when either the object in which they are embedded or the object which they support is subjected to vibration. Further, because they can be dislodged with comparative ease it is almost impossible to bend them when in place without loosening them. Bending of the bolts is of prime importance in cases where the bolt should normally be positioned at a seam which is a comparatively weak point whereas if the bolt can be bent when in position it could be positioned in the masonry at some point beyond the seam and then bent to the desired position over the seam.

It is an object of this invention to produce an anchor bolt unit which will be free of the foregoing objections.

It is another of the objects of this invention to produce an anchor bolt unit which will be free of the prior art defects and yet be comparatively easy to manufacture and use.

I attain the foregoing as well as other objects by making an anchor bolt unit which consists of the bolt, at least one sleeve of comparatively soft metal such as lead having an external diameter which is slightly less than the diameter of the hole in which the bolt is to be positioned but substantially of the same diameter, of a concave anchor bolt anchor made of comparatively hard metal, such as steel, which has an external diameter preferably substantially equal to that of the sleeve but under no circumstances greater than that of the hole in which the bolt is to be positioned, and so positioning said anchor bolt anchor that the concave or cup portion faces the head of the bolt. The radius of the arc of the anchor bolt anchor is such that when said anchor bolt anchor is in its final (substantially flattened) position the diameter of its bore will be less than the outside diameter of the threads of the bolt with which it is associated and its external diameter will be greater than that of the aperture within which the unit is to be anchored. As a result the bounding edge of said bore in said anchor bolt anchor will enter the threads of said bolt and the external bounding edges of said anchor bolt anchor will bite into the material bounding said aperture. This in turn results in the bolt being securely anchored in position.

My novel anchor bolt anchor is so formed that the sides of its bore and external edges in its initial or concave form are parallel to each other and to the axis of said anchor bolt.

I form said novel anchor bolt anchor by first cupping same to the shape desired, then piercing the bore therein, and then blanking out the entire element.

In the drawings which form a part hereof Fig. 1 shows the elements which make up one of my novel units where two sleeves of comparatively soft metal and two anchor bolt anchors are used.

Fig. 1-A is a side view of the bolt which is one of the elements of my novel unit.

Fig. 1-B is a side view of a sleeve which is the second of the elements of my invention.

Fig. 1-C is an end view of the sleeve shown in Fig. 1-B.

Fig. 1-D is a side view of the anchor bolt anchor which is the third element of my invention.

Fig. 1-E is an end view of the anchor bolt anchor shown in Fig. 1-D.

Fig. 1-F is a side view of a sleeve identical with that shown in Fig. 1-B.

Fig. 1-G is a side view of an anchor bolt anchor identical with that shown in Fig. 1-D.

Fig. 1-H is a side view of a nut which serves the double purpose of holding the elements of the unit against lateral movement off the bolt when in transit and holding in place the item which is to be carried by the anchor bolt.

Fig. 2 is a section through the elements shown in Fig. 1 when mounted on the bolt during transit.

Fig. 3 is a side view partly in section showing the bolt, soft metal sleeve and anchor bolt anchor as they appear when first positioned in the hole in the element in which the bolt is to be anchored. The impacting tool is shown positioned upon the bolt. A part of this tool intermediate its ends has been broken away in order to permit the showing of the other elements on as large a scale as possible.

Figure 1:
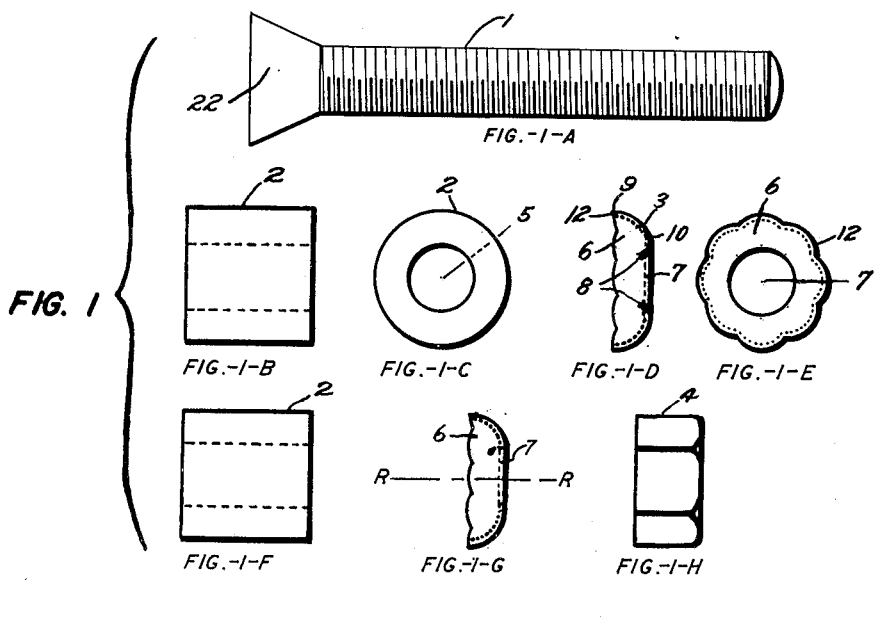
Figure 2:
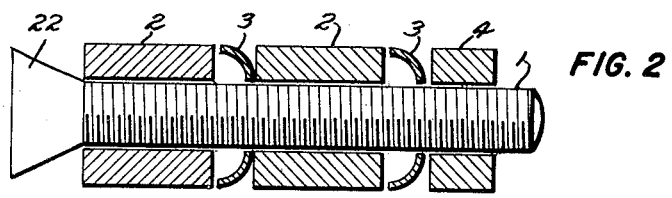
Figure 3:
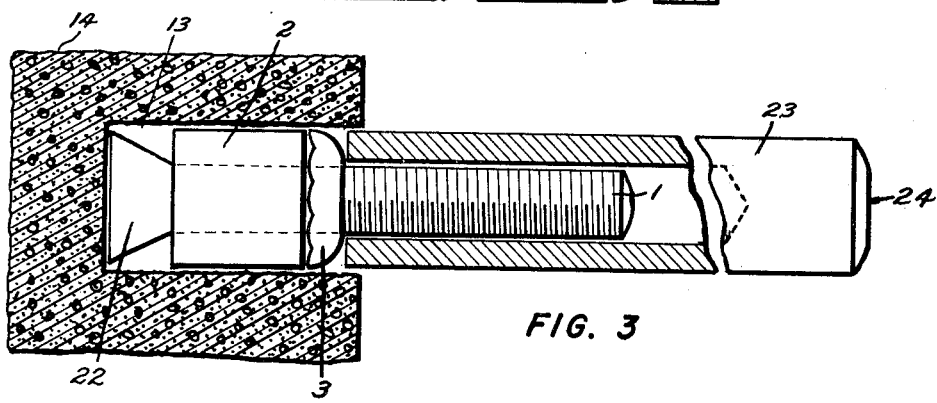

Referring more particularly to the drawings wherein similar reference numerals denote similar parts reference numeral 1 designates the bolt which is one of the elements of my invention, reference numeral 2 the soft metal sleeve which is another of the elements of my invention and reference numeral 3 the dished (concave) hard metal anchor bolt anchor which constitutes the third of the elements of my invention.

The bolt 1 may be of any suitable size and material having a conical head 22.

The sleeve 2 may be of any suitable size permitting it to be associated with a particular bolt 1. It consists of a body member made of comparatively readily malleable material and has formed therein a bore 5. The diameter of the bore 5 is slightly greater than that of the bolt 1 with which the sleeve 2 is to be associated. The external diameter of the sleeve 2 must be smaller than that of the hole 13 in which the bolt 1 is to be anchored. Lead is an example of a suitable material of which the sleeve 2 may be made.

The anchor bolt anchor 3 consists of a concave (cup-shaped) body member 6 preferably terminating in a non-circular bounding edge and has formed therein a bore 7. The wall 8 of the bore 7 is parallel to the wall 9 at the edge of the anchor bolt anchor 3, to the vertical axis of said anchor bolt anchor and to the axis of the bolt 1. The anchor bolt anchor 3 may be of any suitable material having a hardness which is greater than that of the material bounding the hole 13 which is to receive the bolt 1 and sufficient springiness and flexibility to permit it to flatten out without breaking. An example of such a material is steel.

The radius of the curvature of the anchor bolt anchor is such that when it assumes its final operative (substantially flattened) position its external diameter will be greater than that of the hole 13 in which the anchor bolt is positioned. The diameter of the bore 7 of the anchor bolt anchor 3 is such that in its concave (cupped) form it will readily receive the bolt 1 with which it is to be associated, and in its final operative (substantially flattened) form its bounding edges 10 will be received within the threads 11 of the bolt 1. The thickness of the anchor bolt anchor 3 is less than the distance between any two threads of the particular bolt with which it is to be associated.

The peripheral edge 12 of the anchor bolt anchor 3 should not form a continuous circle. Among the many possible non-continuous edges are the scalloped ones shown in Figs. 1–D, 1–E, and 1–G. The scalloped edges 12 of the anchor bolt anchor 3 enable same more readily to bite into the material 14 which bounds the hole 13 in which the anchor bolts are to be anchored.

Figure 6:
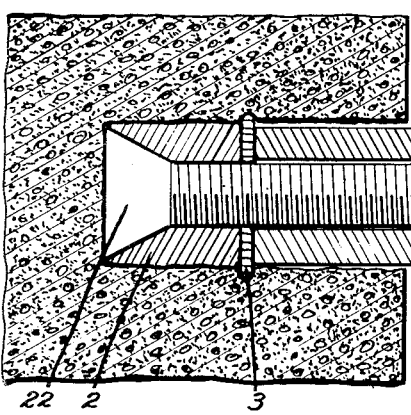
Fig. 6 is a section schematically showing the elements in Fig. 3 as they appear when fully impacted. In this position the sleeve is fully compressed, the anchor bolt anchor has become substantially flat instead of dished, its outer edges have bitten into the sides of the element bounding the bolt receiving hole, and the bounding edges of its central bore have entered into the threads on the bolt.

I may use one or more sleeves 2 and one or more anchor bolt anchors in association with any bolt 1. In each case however the number of anchor bolt anchors 3 is always equal to the number of sleeves 2. Fig. 6 is illustrative of a unit in which one sleeve 2 and one anchor bolt anchor 3 are used. It is also illustrative of the first step in which more than one sleeve 2 and more than one anchor bolt anchor 3 are used.

Figure 7:
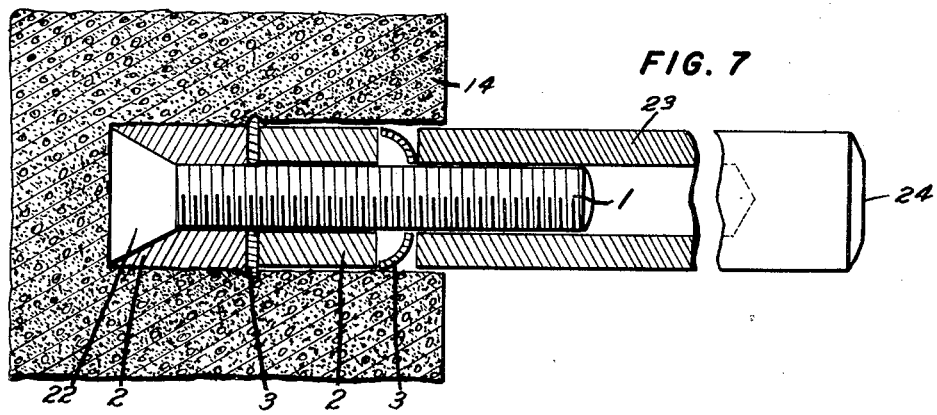
Fig. 7 is a section showing the unit as it appears with the first sleeve and anchor bolt anchor fully impacted and the second sleeve and anchor bolt anchor in the initial position.
Figure 8:
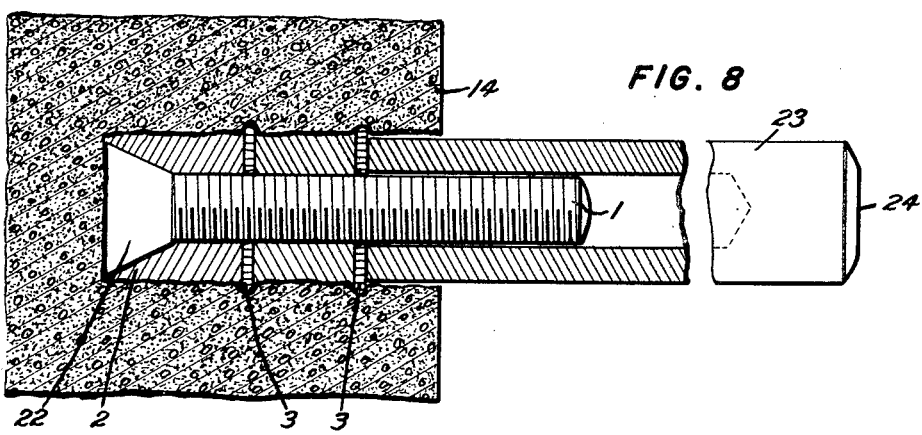
Fig. 8 is a section schematically showing both sleeves and anchor bolt anchors in their fully impacted positions.
Figure 9:
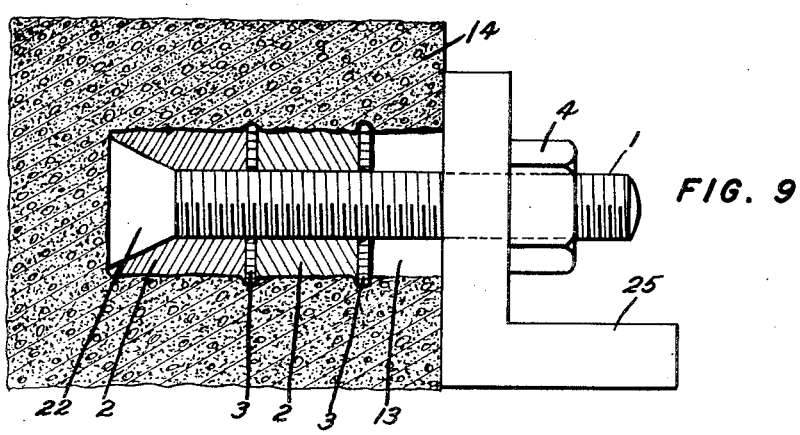
Fig. 9 is a view partly in section showing a bracket carried by the fully anchored bolt shown in Fig. 8.

Figs. 7, 8, and 9 are illustrative of units wherein two sleeves 2 and two anchor bolt anchors 3 are used.

Fig. 10 is illustrative of a unit wherein three sleeves 2 and three anchor bolt anchors 3 are used.

Figs. 3 to 10 inclusive illustrate the successive stages of my novel unit as it is being installed.

Figure 4:
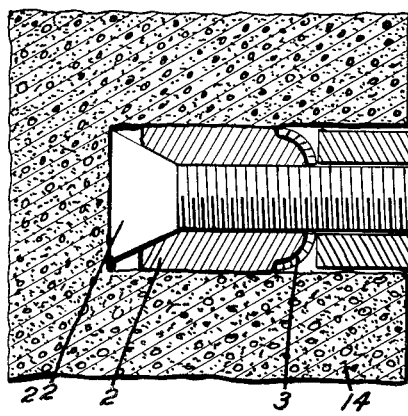
Fig. 4 is a section showing schematically the elements in Fig. 3 as they probably appear after the unit has been subjected to a few impacting blows. At this point the sleeve has moved towards the head of the bolt, contacts both the hole walls and the bolt threads, and the inside face of the anchor bolt anchor.
Figure 5:
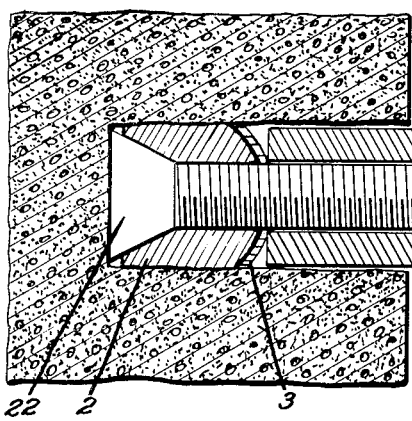
Fig. 5 is a section showing schematically the elements in Fig. 3 as they probably appear after the unit has been subjected to some additional impacting blows. At this point the sleeve has moved further down towards the head of the bolt, has been compressed more than in Fig. 4 and the anchor bolt anchor is beginning to flatten out.

In fixing the anchor bolt in place I first position (see Fig. 3) the bolt 1 in the hole 13. Then I place a sleeve 2. Then I place an anchor bolt anchor 3 on said bolt 1 with the concave (cupped) surface of the anchor bolt anchor 3 facing the head 22 of said bolt. Then I place the impacting tool 23 upon the bolt 1 and strike a suitable number of blows on the head 24 thereof. The successive effects of these blows are schematically illustrated in Figs. 3 to 6 inclusive. The first few tend to compress the sleeve 2, to force same downwardly towards the head of the bolt, to cause part of same to enter the cup of the anchor bolt anchor 3. (The appearance of the unit at the end of these blows is schematically shown in Fig. 4.) The next few blows still further compress the sleeve 2, force same downwardly towards the head 22 of the bolt and tend to cause anchor bolt anchor 3 to begin flattening out. (The appearance of the unit at the end of these blows is schematically shown in Fig. 5.) The last few blows force the sleeve 2 downwardly to its fully impacted and compressed position upon the bolt and cause the anchor bolt anchor 3 to assume its final operative or flattened position. (The appearance of the unit at the end of these blows is schemaically shown in Fig. 6.) It is to be noted that in its fully impacted position the peripheral edges 12 of the anchor bolt anchor 3 bite into the material 14 bounding the aperture 13 in which the anchor bolt unit is positioned and the bounding edge 10 is received within the threads 11 of the bolt 1.

Where only one sleeve 2 and anchor bolt anchor 3 are used the item which is to be carried by the bolt is mounted thereon and then anchored against lateral movement on the bolt by the nut 4. The item which is to be carried by the bolt 1 is schematically shown in Figs. 9 and 10, and designated by the reference numeral 25. Such a structure would be the equivalent of that shown in Fig. 9 with the outermost sleeve 2 and anchor bolt anchor 3 removed.

Where two sleeves and two anchor bolt anchors are used then, after the first set has been fully impacted as schematically shown in Fig. 6, one places a second sleeve 2 and a second anchor bolt anchor 3 upon the bolt in the manner illustrated in Fig. 7. Then one positions the impacting tool 23 upon the bolt 1 and strikes the number of blows upon the tool head 24 sufficient to cause the sleeve 2 and anchor bolt anchor 3 to assume their respective fully impacted positions schematically shown in Fig. 7. Then one hangs upon the bolt 1 the item 25 to be carried thereby and anchors same against lateral movement thereon by means of the nut 4.

Where more than two sleeves 2 and two anchor bolt anchors 3 are to be used one successively positions a sleeve 2 and an anchor bolt anchor 3 upon the bolt 1 and proceeds with each of said sleeves and anchor units in the manner hereinabove specified with reference to the second sleeve and anchor unit. A completed anchor bolt assembly having three sleeves 2 and three anchor bolt anchors 3 is schematically illustrated in Fig. 10.

Having described my novel invention, what I claim as new and useful is:

1. An anchor bolt unit comprising a threaded bolt having an enlarged conical head which is of larger cross-section than that of its body, at least one sleeve of readily malleable material provided with a bore and positioned on said bolt adjacent said head, said sleeve having plane flat end faces, a concavely shaped anchor bolt anchor having a bolt receiving bore formed therein positioned upon said bolt adjacent said sleeve, said anchor being formed of a malleable sheet metal material harder than the material of said sleeve, said anchor being positioned with the concave face thereof adjacent said sleeve and facing said bolt head, the external diameter of said sleeve and said anchor being slightly less but substantially that of the hole which is to receive said unit.

2. An anchor bolt unit comprising a threaded bolt having an enlarged conical head which is of larger cross-section than that of its body, at least one sleeve of readily malleable material comprising lead provided with a bore and positioned on said bolt adjacent said head, said sleeve having plane flat end faces, a concavely shaped anchor bolt anchor having a bolt receiving bore formed therein positioned upon said bolt adjacent said sleeve, said anchor being formed of malleable sheet steel, said anchor being positioned with the concave face thereof adjacent said sleeve and facing said bolt head, the external diameter of said sleeve and said anchor being slightly less but substantially that of the hole which is to receive said unit.

3. An anchor bolt unit comprising a threaded bolt having an enlarged conical head which is of larger cross-section than that of its body, at least one sleeve of readily malleable material provided with a bore and positioned on said bolt adjacent said head, said sleeve having plane flat end faces, a concavely shaped anchor bolt anchor having a bolt receiving bore formed therein positioned upon said bolt adjacent said sleeve, said anchor being formed of a malleable sheet metal material harder than the material of said sleeve, the outer periphery of said anchor having a scalloped bounding edge, said anchor being positioned with the concave face thereof adjacent said sleeve and facing said bolt head, the external diameter of said sleeve and said anchor being slightly less but substantially that of the hole which is to receive said unit.

WALTER BRINTON GREEN.

REFERENCES CITED

The following references are of record in the file of this patent:

UNITED STATES PATENTS

| Number | Name | Date |
|---|---|---|
| 494,745 | Phillips | Apr. 4, 1893 |
| 877,118 | Peirce | Jan. 21, 1908 |
| 1,120,411 | Rohmer | Dec. 8, 1914 |
| 1,506,384 | Pleister | Aug. 26, 1924 |
| 2,203,178 | Peirce | June 4, 1940 |
| 2,298,041 | Dedrick | Oct. 6, 1942 |
| 2,352,118 | Poupitch | June 20, 1944 |
| 2,377,077 | Gay et al. | May 29, 1945 |